United States Patent [19]

Kordonsky et al.

[11] Patent Number: 5,452,745

[45] Date of Patent: Sep. 26, 1995

[54] MAGNETORHEOLOGICAL VALVE AND DEVICES INCORPORATING MAGNETORHEOLOGICAL ELEMENTS

[75] Inventors: William I. Kordonsky; Sergei R. Gorodkin; Alexander V. Kolomentsev; Vladimir A. Kuzmin; Alexander V. Luk'ianovich; Nikolay A. Protasevich; Igor V. Prokhorov; Zinovii P. Shulman, all of Minsk, Belarus

[73] Assignee: Byelocorp Scientific, Inc., New York, N.Y.

[21] Appl. No.: 272,345

[22] Filed: Jul. 8, 1994

Related U.S. Application Data

[62] Division of Ser. No. 973,113, Nov. 6, 1992, Pat. No. 5,353,839.

[51] Int. Cl.⁶ .................................................. F15B 21/00
[52] U.S. Cl. ...................... 137/807; 137/827; 91/358 R; 91/418
[58] Field of Search ................................. 137/806, 807, 137/827; 91/418, 358 R

[56] References Cited

U.S. PATENT DOCUMENTS

| | | | |
|---|---|---|---|
| 4,920,929 | 5/1990 | Bishop | 123/41.49 |
| 5,276,623 | 1/1994 | Wolfe | 364/424.05 |
| 5,277,281 | 1/1994 | Carlson et al. | 188/267 |
| 5,284,330 | 2/1994 | Carlson et al. | 267/140.14 |

Primary Examiner—A. Michael Chambers
Attorney, Agent, or Firm—Kenyon & Kenyon

[57] ABSTRACT

A valve used to control the flow of a magnetorheological fluid, in which the mechanical properties of the magnetorheological fluid are varied by applying a magnetic field, is described. The valve can comprise a magnetoconducting body with a magnetic core that houses an induction coil winding, and an hydraulic channel located between the outside of the core and the inside of the body connected to a fluid inlet port and an outlet port, in which magnetorheological fluid flows from the inlet port through the hydraulic line to the outlet port. Devices employing magnetorheological valves are also described.

4 Claims, 12 Drawing Sheets

MAGNETORHEOLOGICAL VALVE AND DEVICES INCORPORATING MAGNETORHEOLOGICAL ELEMENTS

This application is a division of application Ser. No. 07/973,113, which was filed on Nov. 6, 1992 now U.S. Pat. No. 5,353,839 issued Oct. 11, 1994.

FIELD OF THE INVENTION

This invention relates to valves used in hydraulic devices employing a magnetorheological fluid, and more particularly to valves employed in systems in which a magnetic field is applied to the magnetorheological fluid, causing the properties of the magnetorheological fluid to vary.

BACKGROUND OF THE INVENTION

Valves designed for use with magnetorheological fluids are known in the art. As a fluid flows through such valves a magnetic field is applied to the magnetorheological fluid. The interaction between the ferromagnetic particles in the magnetorheological fluid increases the effective viscosity of the magnetorheological fluid in the valve. This change in viscosity causes the resistance to the fluid flowing through the valve to increase, and causes a proportional change in the inlet pressure to the valve, thereby slowing or stopping the fluid flow.

Known magnetorheological valves are generally large and consume a large amount of power due to the large volume occupied by the hydraulic line. Known magnetorheological valves also have a high initial hydraulic resistance, which limits those valves to a narrow control range. The response speed of these devices is generally slow.

Germer, U.S. Pat. No. 2,670,749, describes a valve for controlling the flow of fluids by means of a magnetic oil. Germer discloses a method of controlling the flow of a fluid by passing the fluid through a magnetic oil subjected to a magnetic field. When the magnetic oil becomes magnetized, it thickens to a semi-solid state and offers increased resistance to a flow of fluids passing through it.

A means for controlling the flow of a traditional fluid is also shown in Japanese Patent No. 63-83476. In the 63-83476 patent, a magnetic fluid positioned within a magnetic inductor is used to drive an intermediate element to control the flow of fluid through the valve.

Neither Germer nor Japanese Patent No. 63-83476 teaches a means for controlling the flow of the magnetic fluid itself. In addition, in valves such as those described in Germer and 63-83476, improvements in response time, power consumption, and overall dimensions are limited by the capacity of the magnetic field to magnetize the magnetic fluid.

OBJECTS AND SUMMARY OF THE INVENTION

It is an object of the invention to provide a magnetorheological valve suitable for use with a magnetorheological fluid.

It is also an object of the invention to directly join the electronic and hydraulic parts of an hydraulic system without intermediate mechanical elements.

It is a further object of the invention to provide a magnetorheological valve whose components enable the geometry of the hydraulic line to be optimized, and the hydraulic resistance of the magnetorheological fluid flow to be thus controlled, so as to increase the speed of response and to widen the control range of hydraulic resistance of the magnetorheological valve and to reduce its overall dimensions and power consumption.

These and other objectives are achieved by a magnetorheological valve comprising a magnetoconducting body with a magnetic core that houses an induction coil winding, and an hydraulic channel located between the outside of the core and the inside of the body connected to a fluid inlet port and an outlet port, in which magnetorheological fluid flows from the inlet port through the hydraulic line to the outlet port. The invention further comprises a magnetorheological valve as described in which a portion of the core projecting beyond the coil winding is provided with a movable element, one end of which is fitted with a cone section provided with a nonmagnetic spiral gasket located in a tapered bore, with the clearance between the cone section and the fixed core forming the hydraulic line. The invention further comprises devices incorporating such magnetorheological valves.

DETAILED DESCRIPTION OF THE PREFERRED EMBODIMENTS

In magnetorheological valves set forth in this application, a magnetorheological working fluid is pumped through a magnetorheological throttle valve controlling element which, in a general case, is a hydraulic channel located in a magnetic field inductor. In response to a control signal, an electric current in the magnetizing coils of the inductor produces a magnetic field that varies the magnetorheological fluid viscosity in such a channel and results in a pressure drop in the valve. The throttling valve is connected to, or integral to, a drive, and the pressure drop causes the force on the actuating element of the drive to vary accordingly. The viscosity of the magnetorheological fluid, and corresponding pressure in the valve, may be held constant at any intermediate value, or may be varied until the valve ultimately closes. The magnetorheological valve thus provides quick-response hydraulic resistance, which can be up to about 1 kHz in some applications.

Figure 1:
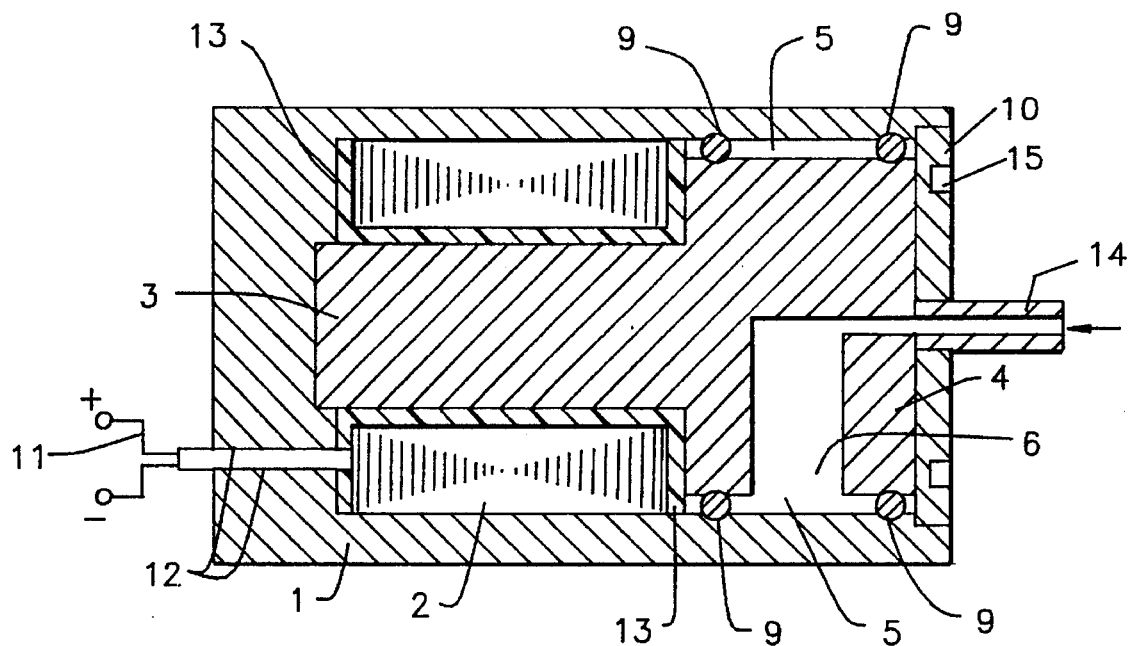
FIG. 1 is a side cross-sectional view of a first embodiment of the magnetorheological valve of the invention.
Figure 2:
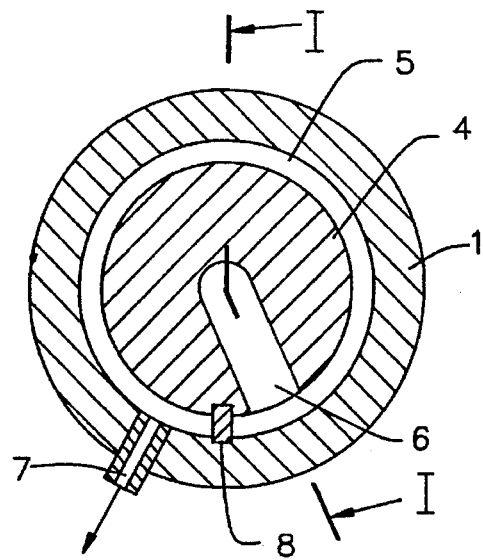
FIG. 2 is a front cross-sectional view of a first embodiment of the magnetorheological valve of the invention.

In FIGS. 1 and 2, there is shown a magnetorheological valve comprising a magnetoconducting body 1 housing an induction coil winding 2 with a core 3. A core portion 4 of the core 3 projects beyond the coil winding 2, with an hydraulic line 5 formed by the surface of the projecting portion of the core 4 and the inside of the body 1. Coil winding 2 is connected to a power supply source 11, such as a DC power supply, which is connected to winding 2 through lines 12. Winding 2 preferably is shielded from direct contact with core 3 by at least partially enclosing winding 2 in a nonmagnetic dielectrical coil body 13. The coil body 13 is preferably made of plastic. One end of the hydraulic line 5 is connected through an inlet port 6 with inlet pipe 14 which extends through a nonmagnetic cover 10, as shown in FIG. 1. The other end of hydraulic line 5 is connected to an outlet port 7, as seen in FIG. 2. Nonmagnetic seals 9 prevent leakage of the fluid from the hydraulic channel 5. Seals 9 preferably comprise O-rings or other conventional seals made from an elastomeric material. Notches 15 may be provided for convenience in assembling the valve.

The design of the hydraulic line 5 increases the area of interaction of a magnetorheological fluid with the magnetic flux, decreases the magnetic resistance, and raises the magnetic induction, with the ampere-turns of the induction coil winding unchanged. It also increases the pressure differential in the hydraulic line, determined by the Pousel expression $\Delta P = 8\mu QL/\pi R^4$, where $\mu$=viscosity, Q=flow rate, L=length of hydraulic line, and R=hydraulic radius. Where the other conditions are held constant, $\Delta P$ will be larger for a longer hydraulic line L. In a magnetorheological valve according to the present invention, the hydraulic line L is made longer than in conventional magnetorheological valves by directing a thin layer of magnetorheological fluid around the circumference of the valve. Such an embodiment of the hydraulic line increases the increment of the pressure differential, with the overall dimensions of the magnetorheological valve substantially reduced. Magnetorheological fluids suitable for use with the value of the invention are disclosed in two co-pending applications, U.S. Ser. No. 868,466, entitled "Magnetorheological Fluids and Methods of Making Thereof" whose disclosure is incorporated herein by reference.

A partition 8 is located in the hydraulic line 5 between the inlet port 6 and outlet port 7. Partition 8 preferably is made of a nonmagnetic material, with stainless steel particularly preferred.

Partition 8 enables the magnetorheological fluid to flow over the full length of the hydraulic line 5, increasing the length of hydraulic line L in the Pousel expression and thereby increasing the pressure differential per unit power consumption. This will aid in reducing power consumption. If no partition is used, the fluid will flow in two directions around the circumference from the inlet port 6 to the outlet port 7. This two directional flow would reduce the length of hydraulic line L, since at least one stream of fluid would traverse one half or less of the hydraulic line and, as a consequence, the pressure differential would be reduced.

The length of hydraulic line 5 between the inlet 6 and outlet 7 ports in which partition 8 is located preferably is less than the remaining length of hydraulic line 5. In a particularly preferred embodiment of the invention, this distance is from about 5 to about 15 per cent of the length of the hydraulic line. If the distance between the inlet and outlet ports is less than about 5 per cent of the length of the hydraulic line, partition 8 may become undesirably difficult to install in the manufacturing process. If the distance between the inlet and outlet ports is greater than about 15 per cent of the length of the hydraulic line, the working surface of the hydraulic line is not used efficiently. A distance between the inlet port 6 and outlet port 7 of less than 15 per cent of the length of the hydraulic line permits maximum interaction between the fluid and the magnetic field, and maximizes the efficiency of the valve.

In operation, the magnetorheological fluid enters through inlet pipe 14 into the inlet port 6, then fills the hydraulic line 5. Partition 8 insures that the magnetorheological fluid flows in only one direction through hydraulic line 5 to outlet port 7. Application of power to coil winding 2 induces a magnetic flux through body 1 and core 3. A magnetic field is established in the hydraulic line 5, with the magnetic lines of force at right angles to the direction of the magnetorheological fluid flow. The magnetic field in the hydraulic line 5 affects the magnetorheological fluid viscosity, and as a consequence the pressure differential between the inlet and the outlet of the magnetorheological valve is changed.

Figure 3:
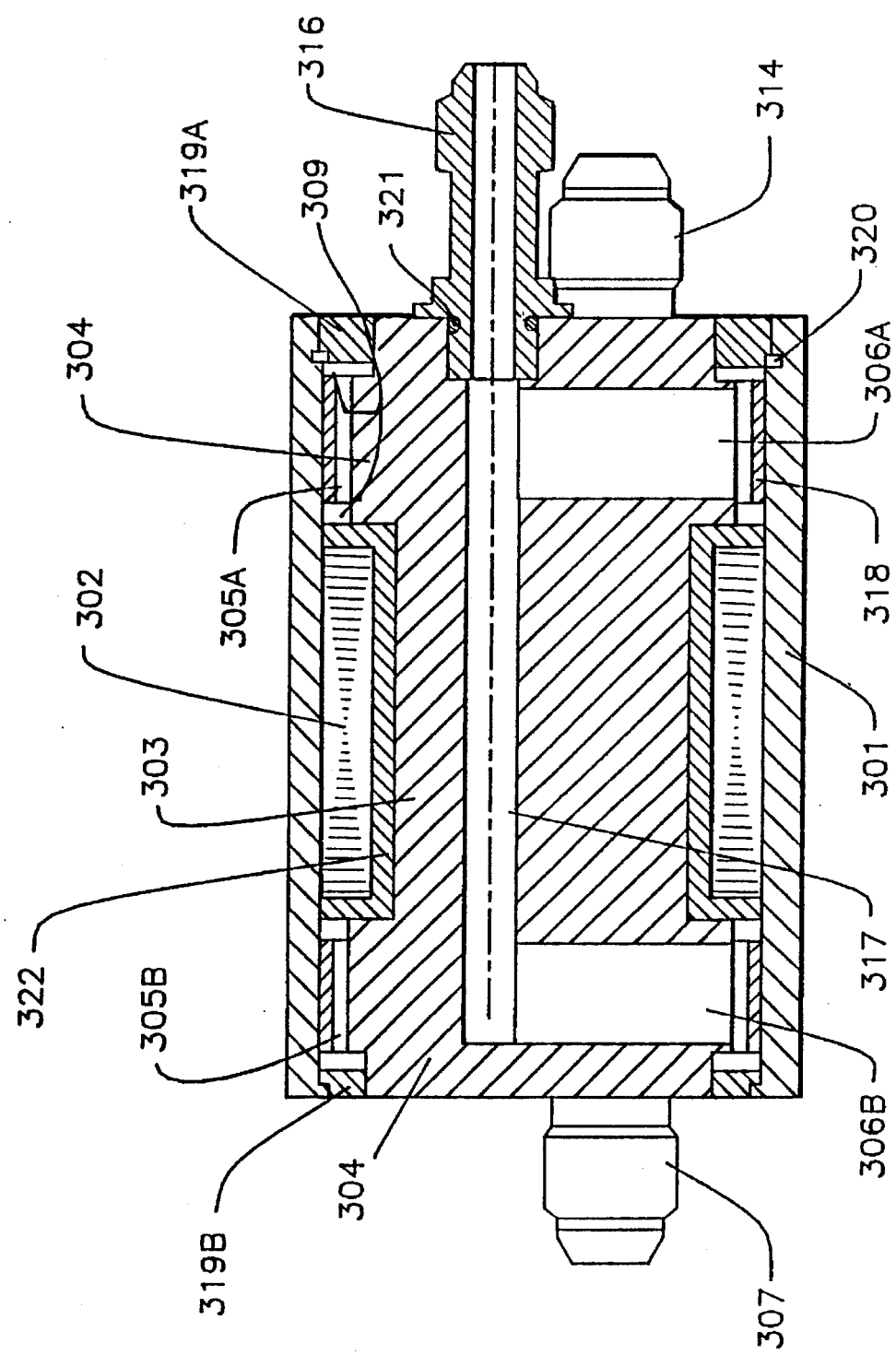
FIG. 3 is a side cross-sectional view of a two-channel embodiment of the magnetorheological valve of the invention.

FIG. 3 shows a valve of the invention having a two-channel design. Similar to FIGS. 1 and 2, the magnetorheological valve in FIG. 3 comprises a magnetoconducting body 301 housing an induction coil winding 302 with a core 303. A portion of the core 304 projects beyond the coil winding 302, and magnetic rings 318 are located between the body 301 and the core 304 adjacent to the induction coil winding 302. First and second hydraulic channels 305A and 305B are formed by the surfaces of the projecting portion of the core 304 and the inside of the magnetic rings 318. The hydraulic channel 305A is connected to an inlet pipe 314 and to hydraulic channel 305B through a first internal channel 306A, a second internal channel 317, and a third internal channel 306B. Each hydraulic channel 305A, 305B is provided with a partition, similar to that shown in FIG. 1 but not shown in FIG. 3, to direct the flow of the magnetorheological fluid over the entire length of the hydraulic line 305A, 305B. Internal channel 317 is connected to an hydraulic accumulator through connection pipe 316, which permits greater control of the flow of magnetorheological fluid.

Hydraulic channel 305B is connected to internal channel 317 through an internal channel 306B at one end, and to an outlet port 307 at the other end. Nonmagnetic seals 309 prevent leakage of the fluid from the hydraulic channels 305. Nonmagnetic covers 319A and 319B assist in providing the correct distribution of the magnetic flux in the valve magnetic system. Nonmagnetic seals 321 prevent leakage of magnetorheological fluid from internal channel 317. Notches 320 may be provided to facilitate assembly and repair of the valve.

In this embodiment, the magnetorheological fluid enters first hydraulic line 305A through inlet pipe 314, flows through first internal channel 306A to internal channel 317, and flows through channel 317 to third internal channel 306B. The fluid that enters third internal channel 306B flows through second hydraulic line 305B to outlet port 307. Application of power to coil 302 induces a magnetic flux through body 301 and core 303. A magnetic field is established in hydraulic lines 305A and 305B, with the magnetic lines of force at right angles to the direction of the magnetorheological fluid flow. The magnetic field in hydraulic lines 305A and 305B affects the magnetorheological fluid viscosity, and as a consequence the pressure differential between the inlet and the outlet of the magnetorheological valve is changed. The two-channel embodiment of FIG. 3 can result in increased efficiency and pressure differentiation, even as compared to the valve embodiment of FIGS. 1 and 2.

Figure 4:
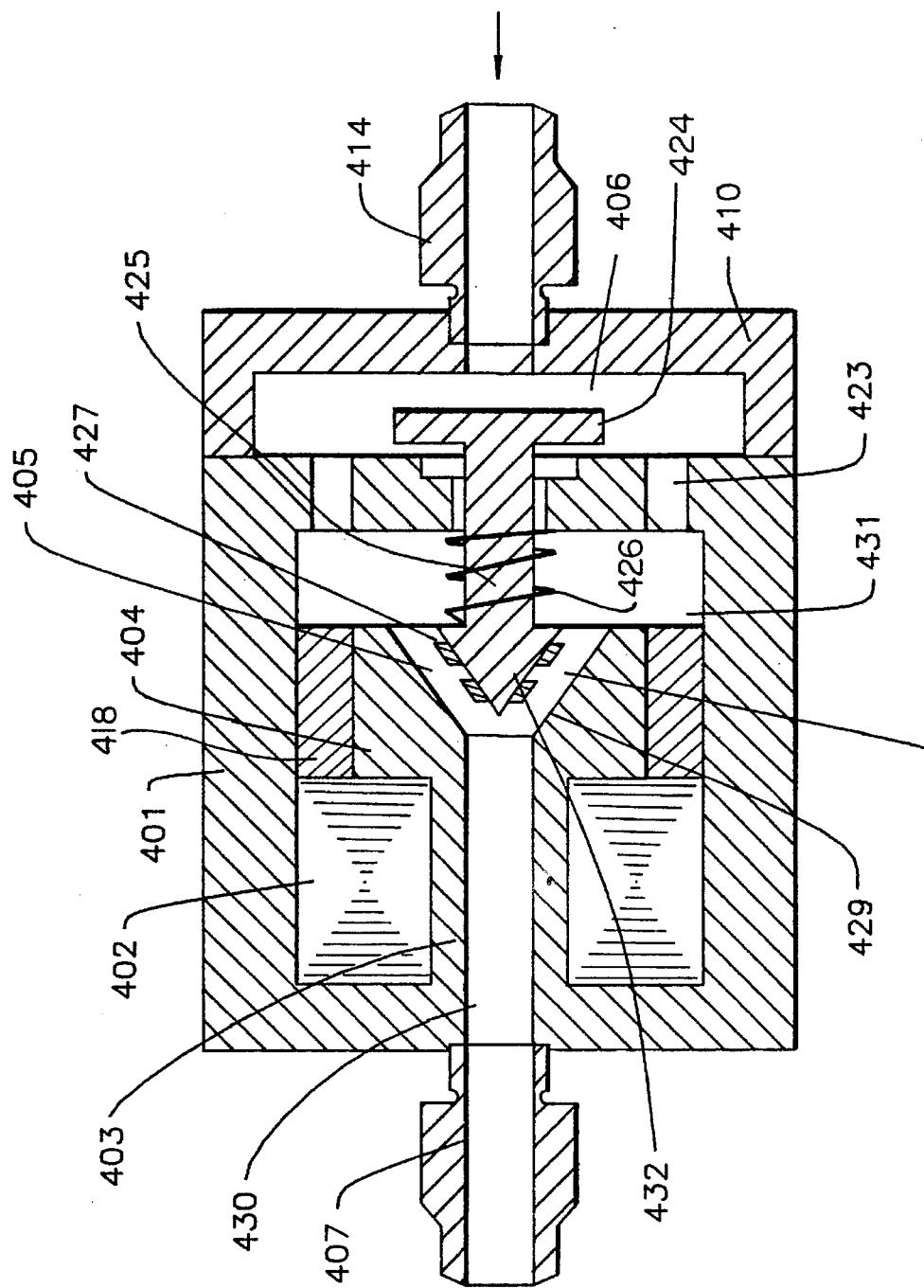
FIG. 4 is a side cross-sectional view of another embodiment of the magnetorheological valve of the invention.

FIG. 4 illustrates an alternative valve of the invention. The magnetorheological valve in FIG. 4 comprises a magnetoconducting body 401 housing an induction coil winding 402 with a magnetoconducting core 403. A portion of the core 404 projects beyond the coil winding 402. As illustrated in FIG. 4, a portion 404 of the core projecting beyond coil winding 402 may be provided with a magnetoconducting movable element 425. An hydraulic channel 405 is formed by the surface of the projecting portion of the core 404 and the movable element of the core 425. One end of the hydraulic line 405 is connected via an internal channel 431, inlet channels 423, and an inlet port 406 to an inlet pipe 414, and the other end is connected via an outlet channel 430 to an outlet port 407.

Movable element 425 is connected to body 401 by a spring 426. One end of movable element 425 has a cone section 432, and the opposite end of movable element 425 is provided with a stop 424 located on the outside of body 401. The cone section 432 of the movable element 425 is located, with a clearance 428, in a tapered bore 429 formed in the projecting portion 404 of the core 403. Hydraulic line 405 is located in the clearance 428 between the conical surfaces of the projecting portion of the core 404 and the cone section 432 of the movable element 425.

Such an embodiment enables a positive hydraulic resistance feedback and ensures a low initial hydraulic resistance; the valve, when closed, will then take less time to build up the pressure to a preset level. In addition, the possibility of varying the flow area of the hydraulic line and the flow change-over from axisymmetric to circumferential enable the control range of hydraulic resistance to be widened.

One of the conical surfaces of the core 432 preferably is provided with a band-type nonmagnetic element 427 preferably arranged on the Archimedean spiral, which allows a minimum channel-forming clearance in in the magnetic circuit and changes the flow pattern from axisymmetric to circumferential. Such an embodiment also enables the control range of hydraulic resistance to be widened.

The outside of the body 401 is completed, on the side of the movable element 425, with a nonmagnetic cover 410 so that an inlet port 406 is formed. The inlet port 406 is connected to the hydraulic line 405 by inlet channels 423 and internal channel 431. Nonmagnetic element 418 provides the correct distribution of the magnetic flux in the magnetorheological valve.

The magnetorheological valve illustrated in FIG. 4 operates as follows. A magnetorheological fluid is delivered to the inlet pipe 414, fills inlet port 406, enters the hydraulic line 405 via the inlet channels 423 and internal channel 431, then flows to the outlet port 407 through outlet channel 430.

When the magnetic induction coil 402 is energized, the resulting magnetic field has an effect on the magnetorheological fluid flowing in the hydraulic line. The magnetic interaction brought about in the clearance 428 between the movable element 425 and the projecting portion 404 of the core 403 moves the movable element 425 in the axial direction so as to decrease the clearance 428. The magnetic force and the hydrodynamic force of the flow will exceed the elastic force of the spring 426 until the movable element 425 occupies, in the clearance 428, the position predetermined by the thickness of the band-type nonmagnetic element 427.

In this position the band-type nonmagnetic element 427 can function as a seal for the axisymmetric flow, and the magnetorheological fluid flow path becomes circumferential on a spiral, with the stop 424 preventing the movable element 425 from rotating around the longitudinal axis.

The hydraulic resistance of the valve is thereafter controlled by varying the magnetizing current in the induction coil, i.e. the magnetic field strength in the clearance 428.

When the induction coil is de-energized, the movable element 425 is restored to its original position by the spring 426.

The magnetorheological fluid and the magnetorheological valve may be employed in a variety of applications, such as robot drives, dashpots, metering pumps, vibrators, and trainers. The magnetorheological fluid may perform an "active" role in the function of the application, such as causing an actuator to move a load, or may be a "passive" controlling element slowing the movement of an actuator driven by another energy carrier. Among the useful applications are pneumatic positioning drives and pneumohydraulic positioning drives, such as might be used in a robot, an exercise machine, a vibration damping system, and a stabilization system. The magnetorheological valve enables one to improve the operating characteristics and reliability of systems in which it is employed. The devices described herein as employing magnetorheological valves can include any of the valves of the invention.

Figure 5:
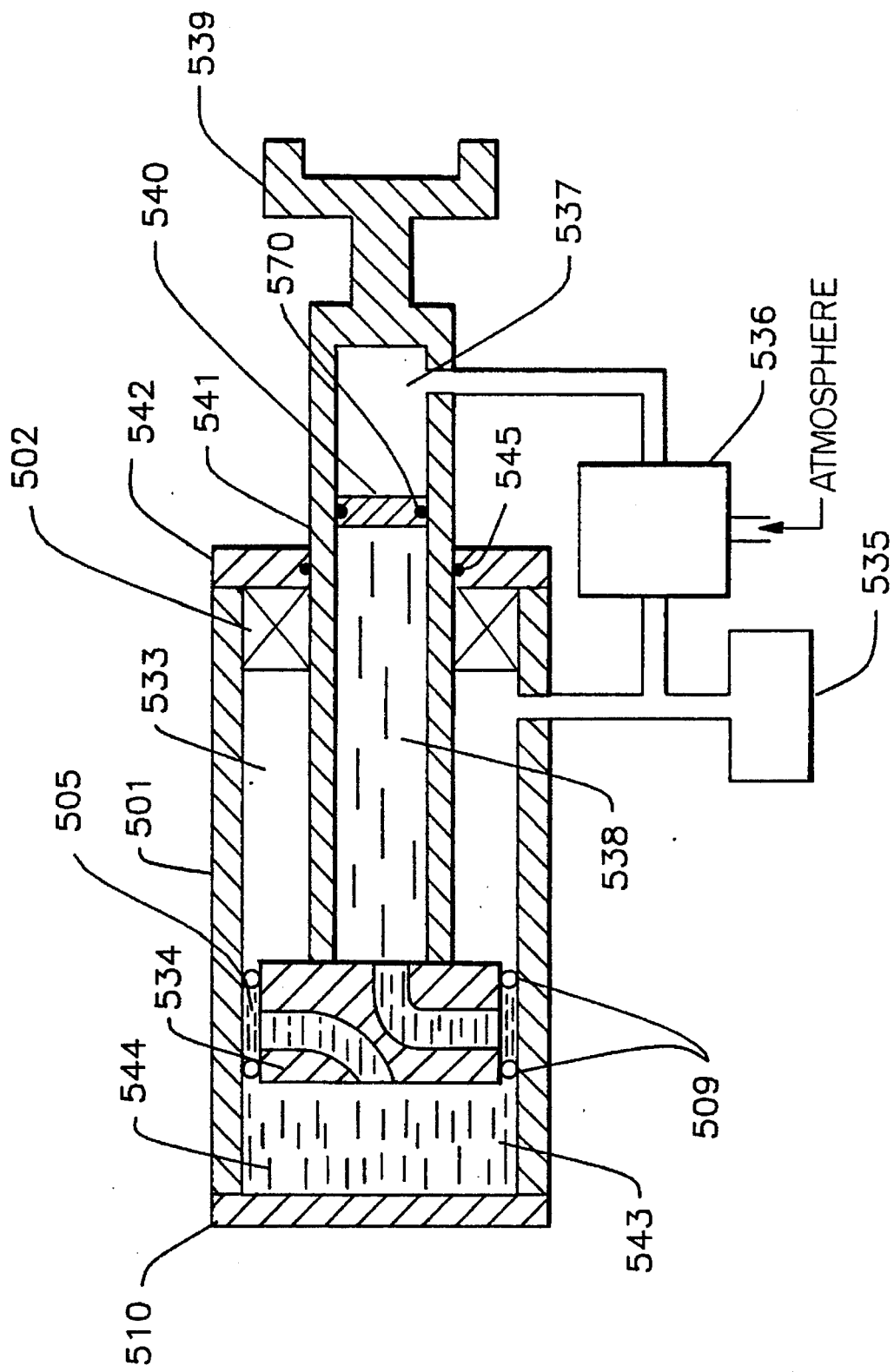
FIG. 5 is a side cross-sectional view of a translational module of a commercial robot employing a valve of the invention.

A pneumatic positioning drive using magnetorheological elements is shown in FIG. 5. The drive provides system rigidity and broad dynamic velocity control range. Such a drive also permits accurate positioning with no unwanted stops at any trajectory point and makes control throughout deceleration possible. Use of such a drive enables one to extend the functional potential of the simplest means of robotics (pneumatic robots) due to a transition from a cycle to a circuit control. A drive such as the drive illustrated in FIG. 5 is relatively simple to manufacture, reliable in operation, explosive-safe and is directly connected with the electronic units of the control system.

As can be seen in FIG. 5, a rodless end 544 of a cylinder 501 is connected with a pneumatic system 535 via a connected-series hydraulic channel 505, a first chamber 538, a second chamber 537 and a pneumatic distributor 536. A second end 533 of cylinder 501 is connected directly with pneumatic system 535. First and second chambers 538, 537 are partitioned by a movable partition 540. Nonmagnetic seals 545 prevent leakage of the fluid into pneumatic chamber 537, and nonmagnetic seals 570 prevent leakage of the air from pneumatic chamber 537 into hydraulic chamber 538. A rod 541 is rigidly connected with an actuator 539. The area between the rodless end 544 of cylinder 501 and a head of piston 534, the hydraulic channel 505, and the first chamber 538 are each filled with a magnetorheological fluid 543. Hydraulic channel 505 containing fluid 543 acts as a clearance between the side surface of piston 534 and the inner surface of cylinder 501. Nonmagnetic seals 509 prevent leakage of the magnetorheological fluid into second end of cylinder 533. A magnetic field inductor coil 502 is mounted on the inner surface of a front cover 542 coaxially to rod 541. Cylinder 501, front cover 542, rod 541 and piston 534 are made of magnetosoft material, and back cover 510 is made of nonmagnetic material.

The apparatus operates as follows. Depending on the required direction, pneumatic distributor 536 connects second chamber 537 either with pneumatic system 535, or with the atmosphere. A pressure drop on piston 534 puts rod 541 and actuator 539 into motion. In this case, magnetorheological fluid 543 is displaced from first chamber 538 and flows through hydraulic channel 505 into the rodless end of cylinder 544. A magnetic field induced by magnetic field inductor coil 502, via rod 541, piston 534, hydraulic channel 505, cylinder 501 and front cover 542, affects fluid 543 being in hydraulic channel 505. In this case, the pressure drop in hydraulic channel 505 exerts a decelerating influence on piston 534. Varying the current in magnetic field inductor coil 502 regulates a speed of the actuator up to its complete stop and fixing at a required position.

Figure 6:
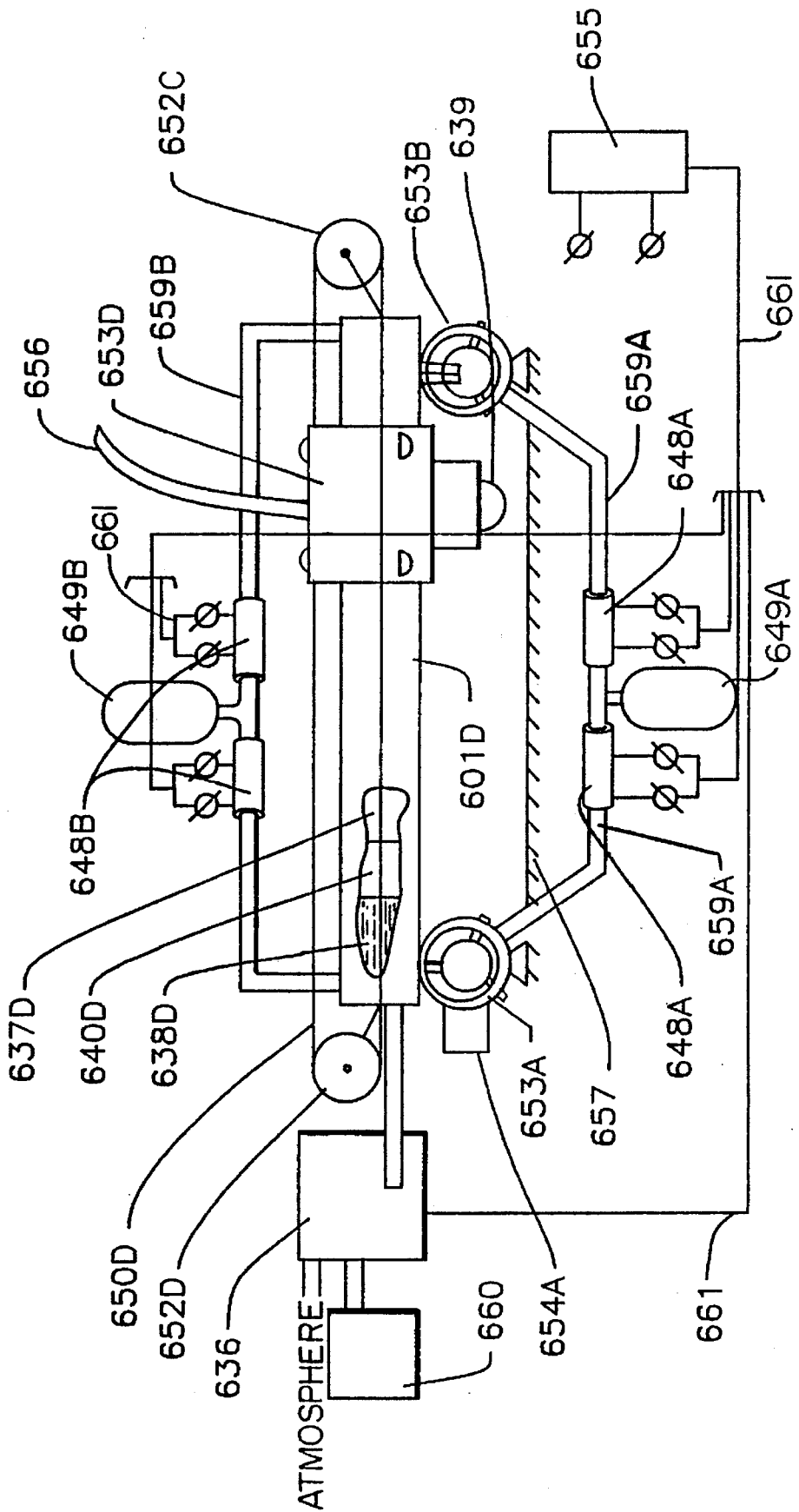
FIG. 6 is a side view of a positioning pneumatic hydraulic drive employing a valve of the invention.
Figure 7:
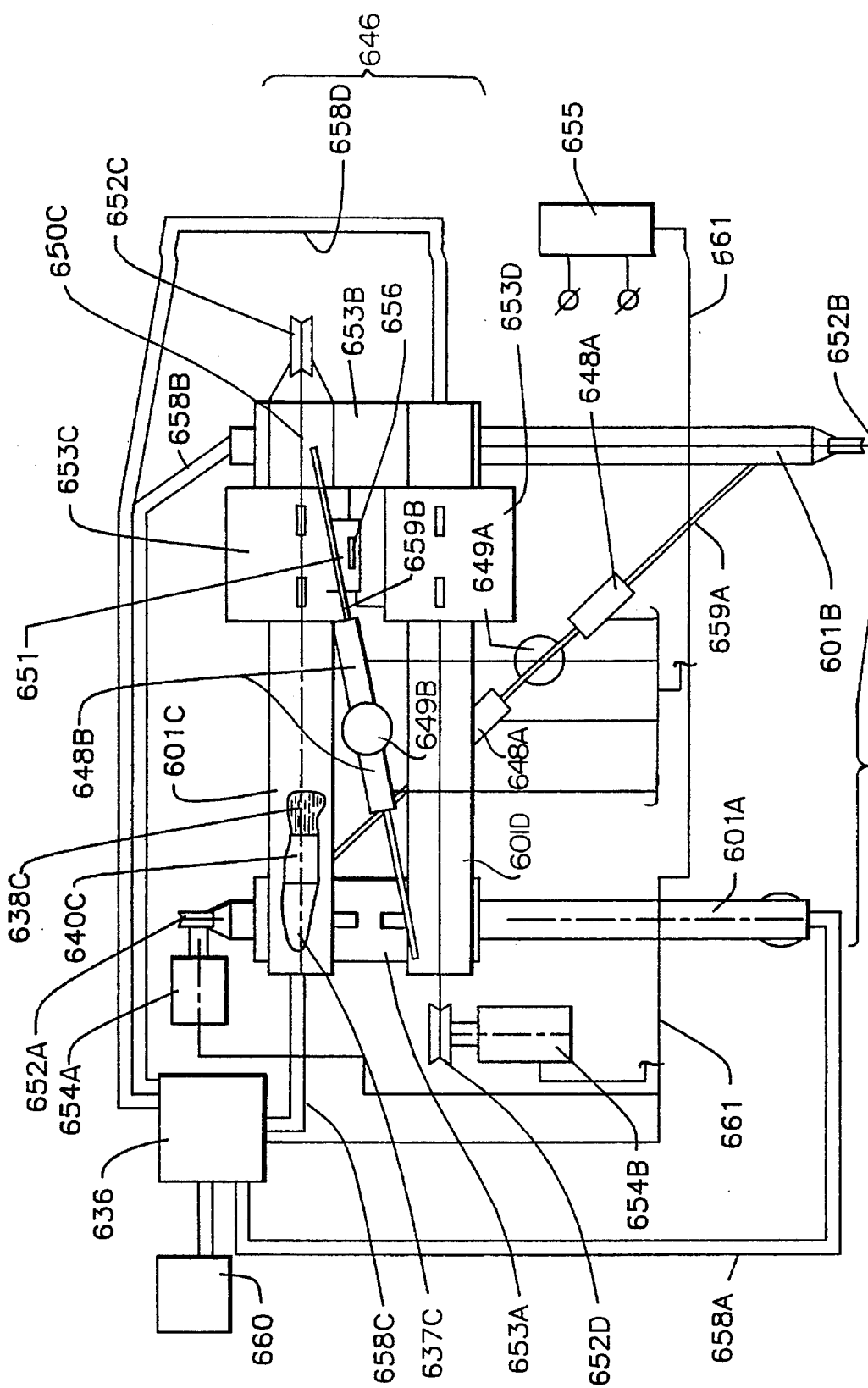
FIG. 7 is a top plane view of the positioning pneumatic hydraulic drive of FIG. 6.

A two-coordinate positioning pneumatic hydraulic drive using magnetorheological elements is shown in FIGS. 6 and 7. Such a drive is intended for programmed two-coordinate displacement in the space of a carriage.

A two-coordinate pneumatic drive is composed of two similar-operation drives 646 and 647 as shown in FIG. 7. Each drive contains two main cylinders 601, each of which is partitioned by a piston 640 into a pneumatic cavity 637 and an hydraulic cavity 638. Each pneumatic cavity 637 is connected to a pneumatic distributor 636 via a pneumatic connecting pipe 658. The location of pneumatic connecting pipes 658 is not important to this invention; they may be arranged for convenience of assembly. They are arranged for ease of illustration in FIG. 6. Each hydraulic cavity 638 is filled with a magnetorheological fluid and connected to a controlling magnetorheological hydraulic system, each of which is composed of two magnetorheological valves 648, an hydraulic accumulator 649, and connecting pipelines 659.

To illustrate, drive 646 contains two cylinders 601C and 601D. Cylinder 601C is partitioned by a piston 640C into a pneumatic cavity 637C and an hydraulic cavity 638C. Cylinder 601D is partitioned by piston 640D into pneumatic cavity 637D and hydraulic cavity 638D. Pneumatic cavities 637C and 637D are connected to pneumatic distributor 636 via pneumatic connecting pipes 658C and 658D respectively. Hydraulic cavities 638C and 638D are connected via hydraulic connecting pipes 659B, two magnetorheological valves 648B and hydraulic accumulator 649B.

In each cylinder a flexible rope 650, which passes through hydraulic cavity 638, connects piston 640 to a pulley casing 653 by means of a pulley unit 652. A carriage 651 moves over the external surface of cylinders 601 by pulley casings 653 which form with the cylinders 601 the rolling guides. A photoelectric position and velocity transducer 654A is placed on the axis of pulley unit 652A, and transducer 654B is placed on the axis of pulley unit 652D. Transducers 654A and 654B, magnetorheological valves 648A and 648B, and pneumatic distributor 636 are connected by lines 661 to a program control device 655. In alternate embodiments, transducers 654A and 654B, magnetorheotogical valves 648A and 648B, and pneumatic distributor 636 may be connected by other means, such as remote control. Carriage 651 is equipped with an actuator 639. Actuator 639 preferably is an hydraulic cutter, which is connected with an high-pressure source via a flexible pipeline 656. Drive 647 serves as a carriage for drive 646. The two-coordinate pneumatic drive is supported by a drive base 657.

A position circuit pneumatic hydraulic drive used for actuator displacement along one of the coordinates operates as follows. The pneumatic distributor 636, which is controlled by program device 655, connects one of the pneumatic cavities 637C with the pneumatic system 660 and the second cavity 637D with the atmosphere. In this case, piston 640C of first cylinder 601C displaces the magnetorheological fluid from its hydraulic cavity 638C into the hydraulic cavity 638D of the second cylinder 601D through hydraulic connecting pipes 659B, magnetorheological valves 648B and hydraulic accumulator 649B. Piston 640D of the second cylinder 601D, rope 650D, and carriage 651 move in guides 653C and 653D accordingly. An excess pressure is produced by hydraulic accumulator 649B in the magnetorheological hydraulic system, symmetric about its magnetorheological valves 648B, and as a result of this excess pressure and the connection of the ropes 650C and 650D with pistons 640C and 640D, movable elements—pistons 640, flexible rope 650, carriage 651—move substantially as a unit, thus providing a required rigidity of the drive. The excess pressure in the hydraulic system is also necessary to lessen the effect of possible gas and air occlusions on the dynamics of the drive. A kinematic scheme of the mechanical and hydraulic parts of the drive is made so that under any operating conditions the situation is possible where the magnetorheological fluid would appear under rarefaction, i.e., the potential cavitation and loss of stable functioning of the drive is decreased.

When ropes 650C and 650D are moved, transducer 654B, which is mounted axially on pulley unit 652D, generates electrical signals corresponding to the speed of carriage 651 and the position relative to the chosen counting base. Transducer signals enter device 655, are compared with the program course and, as a result, device 655 outputs controlling signals which are supplied to the magnetorheological valves 648B and the pneumatic distributor 636. The controlling signals induce a magnetic field in the valve windings, thus varying their hydraulic resistance up to complete shut-off; as a result, the drive motion and its position are controlled. Simultaneous shut-off of the two valves 648B stops the flow of magnetorheological fluid from hydraulic accumulator 649B to hydraulic cavity 638D and connecting lines 659B of the magnetorheological controlling hydraulic system, thereby providing the drive with rigidity at abrupt sign-variable loads at carriage 65i under the positioning conditions.

Drive 647 contains cylinders 601A and 601B. Cylinders 601A and 601B are each partitioned by a piston, 640A and 640B, respectively, into a pneumatic cavity, 637A and 637B, and an hydraulic cavity, 638A and 638B. Pneumatic cavity 637A is connected to pneumatic distributor 636 via pneumatic conduit 658A, and 637B is connected via 658B. Hydraulic cavities 638A and 638B are connected via hydraulic conduits 659A, two magnetorheological valves 648A and hydraulic accumulator 649A. Drive 647 operates in the same manner as described for drive 646.

Figure 8:
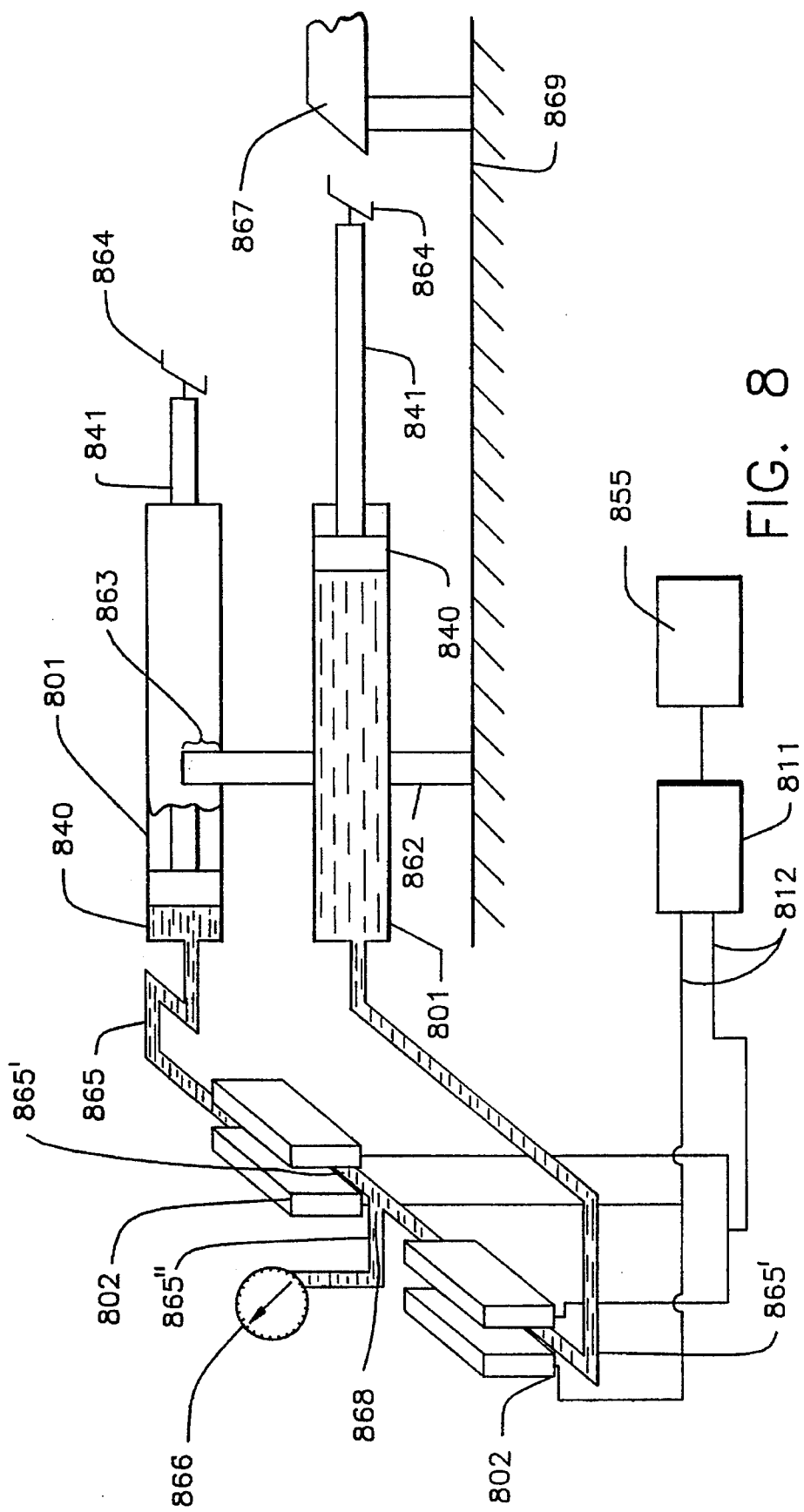
FIG. 8 is a side view of an exercise machine employing a valve of the invention.

FIG. 8 shows a trainer, suitable for use in developing or diagnosing muscle strength, using magnetorheological elements. The trainer consists of two preferably identical hydraulic cylinders 801 fastened to an holder 862 by means of an adjustment unit 863. Adjustment unit 863 allows the position and orientation of the hydraulic cylinders to be adjusted to provide desirable conditions for the user. The hydraulic cylinders 801 are rigidly connected, via holder 862, to a trainer base 869, and an adjustable user's seat 867 is mounted to the base 869.

In each cylinder 801, a piston 840 is rigidly connected via a rod 841 with an element 864 carrying pedal load. The cavities of the hydraulic cylinders 801 are filled with a polarizing structure-reversible medium, such as magnetorheological fluid polarized by a magnetic field. The cavities are connected by an hydraulic drive 865 composed of three sections: first and second sections 865', each of which is in the range of a controlled polarizer 802, and a measuring section 865", to which a pressure meter 866 is connected. Each section 865 is filled with magnetorheological fluid, as illustrated. For ease of manufacture and repair, sections 865' and section 865" of the hydraulic drive may comprise a single two-channel valve 868 such as the valve illustrated in FIG. 3. If a valve such as is illustrated in FIG. 3 were used, the pressure meter 866 would be connected to the connecting pipe 316. The valve 868 is connected to an electric supply source 811.

The polarizers 802 are connected through lines 812 to an electric supply source 811. By varying the current supplied to polarizers 802, the intensity of the magnetic field in the magnetorheological drive 865 can be varied. The corresponding increase or decrease in the viscosity of the magnetorheological fluid will cause an increase or decrease in the resistance of pedal 864 to movement. In one embodiment of the trainer, the force required to move the pedal may be varied from 1–100 kg, the power of the controlling current to the magnetorheological valve is no more than 10 W, and the volume of magnetorheological fluid employed in the system is 1–1.5 liters.

The electric supply source 811 may be connected with a program control device 855, such as a microprocessor, programmable controller, or personal computer. The load may therefore be controlled manually or in a programmed regime.

Figure 9:
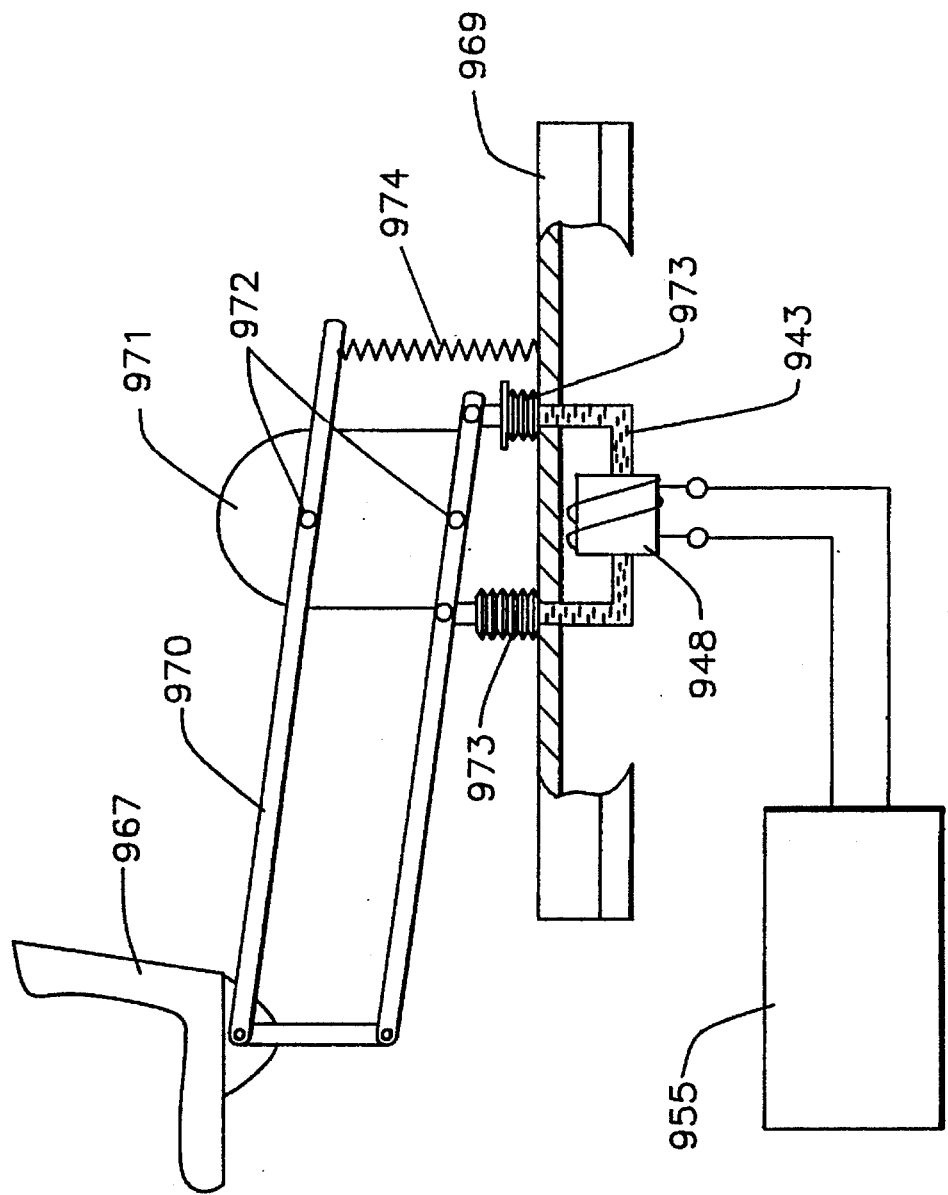
FIG. 9 is a side view of a vibration damping system used as a suspension system for a driver's seat employing a valve of the invention.

FIG. 9 illustrates a driver's seat using a magnetorheological dashpot to provide suspension in, for example, a tractor, road machine, or similar vehicle. The suspension comprises a base 969 on which one or more pillars 971 are fixed. Axles 972 are located on the pillars 971, and a lever system 970 is mounted to the axles 972. Movable magnetorheological load-bearing elements 973 are located between the lever system 970 and the base 969. Load-bearing elements 973 may be bellows, hydraulic cylinders, or other similar means, wherein one end of the load-bearing element may be held stationary and another end may be elastically extended and retracted. The stationary end of each load-bearing element 973 is connected with base 969. The hydraulic cavity of each load-bearing element 973 is filled with a magnetorheological fluid 943, and the load-bearing elements 973 are connected with each other via a magnetorheological valve 948. Magnetorheological valve 948 is electrically connected to a control system 955. A vibration isolation mass 967, such as a driver and seat, is located on one end of the lever system 970, and the opposite end of the lever system 970 is connected with base 969 via an elastic coupling 974.

The suspension system operates as follows. When the vehicle moves, the vehicle base 969 vibrates, and the mass 967 shifts relative to base 969, thus rotating lever system 970 on axles 972. The movement of lever system 970 causes elastic coupling 974 to deform, and displaces the moving parts of load-bearing elements 973. In this case, while one of the elements 973 is extended, another is compressed. Thus, vibrations of mass 967 relative to base 969 cause magnetorheological fluid to be pumped through magnetorheological valve 948 from one load-bearing element 973 to another. Varying the hydraulic resistance of the magnetorheological valve by control system 955 results in changes of the dissipative parameters of vibrations, which may be used for reducing the amplitude of vibrations, their damping time, and vibration overloads. The advantages of this system are its simple, highly efficient design that provides flexibility and quick reaction rates at a low cost.

Figure 13:
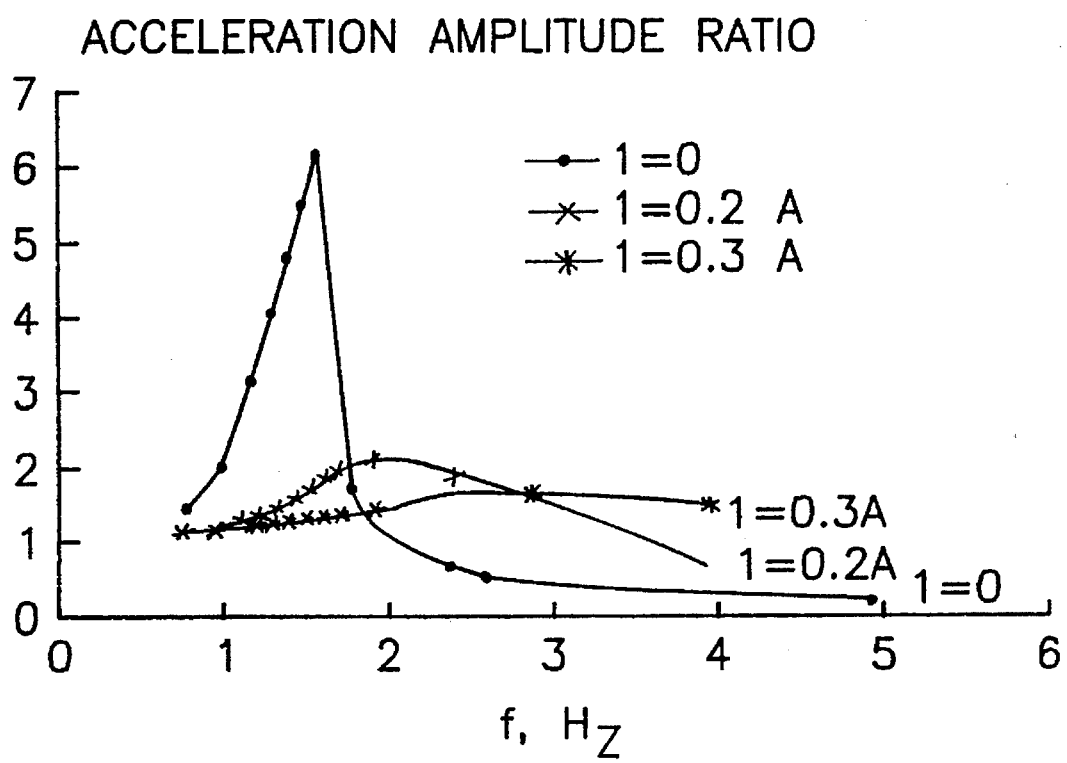
FIG. 13 is a graph illustrating the effects of the magnetorheological vibration damping system of FIG. 9.

FIG. 13 illustrates the effects of the magnetorheological vibration system described above and shown in FIG. 9. FIG. 13 depicts the cushion seat to suspension base acceleration amplitude ratio as a function of exciting oscillations. As illustrated, increasing the throttle valve current I sharply reduces resonance accelerations and varies the resonance frequency. Both of these factors may successfully be used for effective control of a seat suspension. Based on this principle, it is possible to design automatic suspensions of numerous devices, including bearing wheels of transport vehicles, vibration-isolation systems of devices, tools, and materials to be transported.

Figure 10:
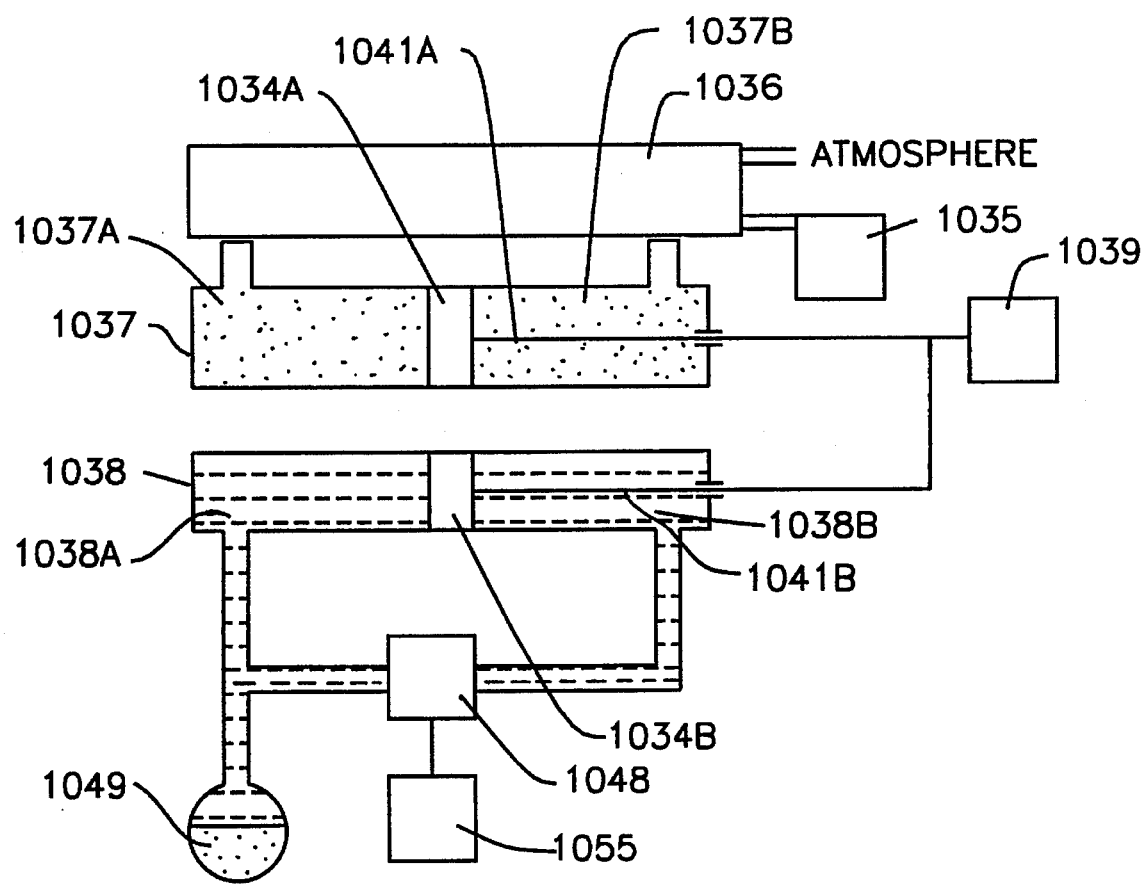
FIG. 10 is a pneumatic magnetorheological drive employing a valve of the invention.

A schematic of another pneumatic magnetorheological drive is shown in FIG. 10. In the drive shown there are two cylinders, a pneumatic cylinder 1037 and an hydraulic cylinder 1038. A piston 1034A connected to a rod 1041A partitions the pneumatic cylinder into two chambers 1037A and 1037B, and a piston 1034B connected to a rod 1041B partitions the hydraulic cylinder into two chambers 1038A and 1038B. Rods 1041A and 1041B are rigidly connected to each other, and are engaged with an actuator 1039.

Chambers 1037A and 1037B of pneumatic cylinder 1037 are connected with a pneumatic distributor 1036 which connects them with either a pneumatic system 1035 or environment.

Chambers 1038A and 1038B of the hydraulic cylinder are filled with magnetorheological fluid, and are connected to each other via a magnetorheological valve 1048, such as those described above. Magnetorheological valve 1048 is connected to a control system 1055.

To move the actuator 1039, pneumatic distributor 1036 supplies air from pneumatic system 1035 to pneumatic chamber 1037A, and the air pressure in pneumatic chamber 1037A is increased. As the air pressure is increased, piston 1034A moves in the direction of actuator 1039. Rigidly connected rods 1041A and 1041B, piston 1034B, and actuator 1039 move with piston 1034A in the direction of the actuator 1039. As rods 1041A and 1041B and pistons 1034A and 1034B move, magnetorheological fluid flows through magnetorheological valve 1048. To slow or stop the motion, control system 1055 varies the strength of the magnetic field in magnetorheological valve 1048. Thus, the speed of the drive may be controlled and the actuator may be accurately positioned.

Chamber 1038A and magnetorheological valve 1048 are connected with an hydraulic accumulator 1049, which compensates for changes in the volume of magnetorheological fluid in the hydraulic cylinder when the piston 1034B moves. The hydraulic accumulator 1049 also accumulates excess hydraulic system pressure, which is necessary to improve the rigidity of the drive and its dynamic characteristics, and the accumulator 1049 facilitates replenishment of magnetorheological fluid when necessary.

Thus the pneumatic magnetorheological drive shown in FIG. 10 allows for control over a wide range of speeds, and may be positioned precisely without stops. Moreover, the ability to control the drive at all stages of deceleration enables one to avoid undesirable accidents even at high speeds. Some advantages of the pneumatic magnetorheological drive are that it uses a convenient energy carrier (compressed gas) and a simple scheme of providing accurate positioning and quick-response. The drive is also highly reliable and fire-safe. And it offers the flexibility of changing the programming. Such devices are promising in the design of multipurpose positioning drives for different fields of mechanical engineering.

Figure 11:
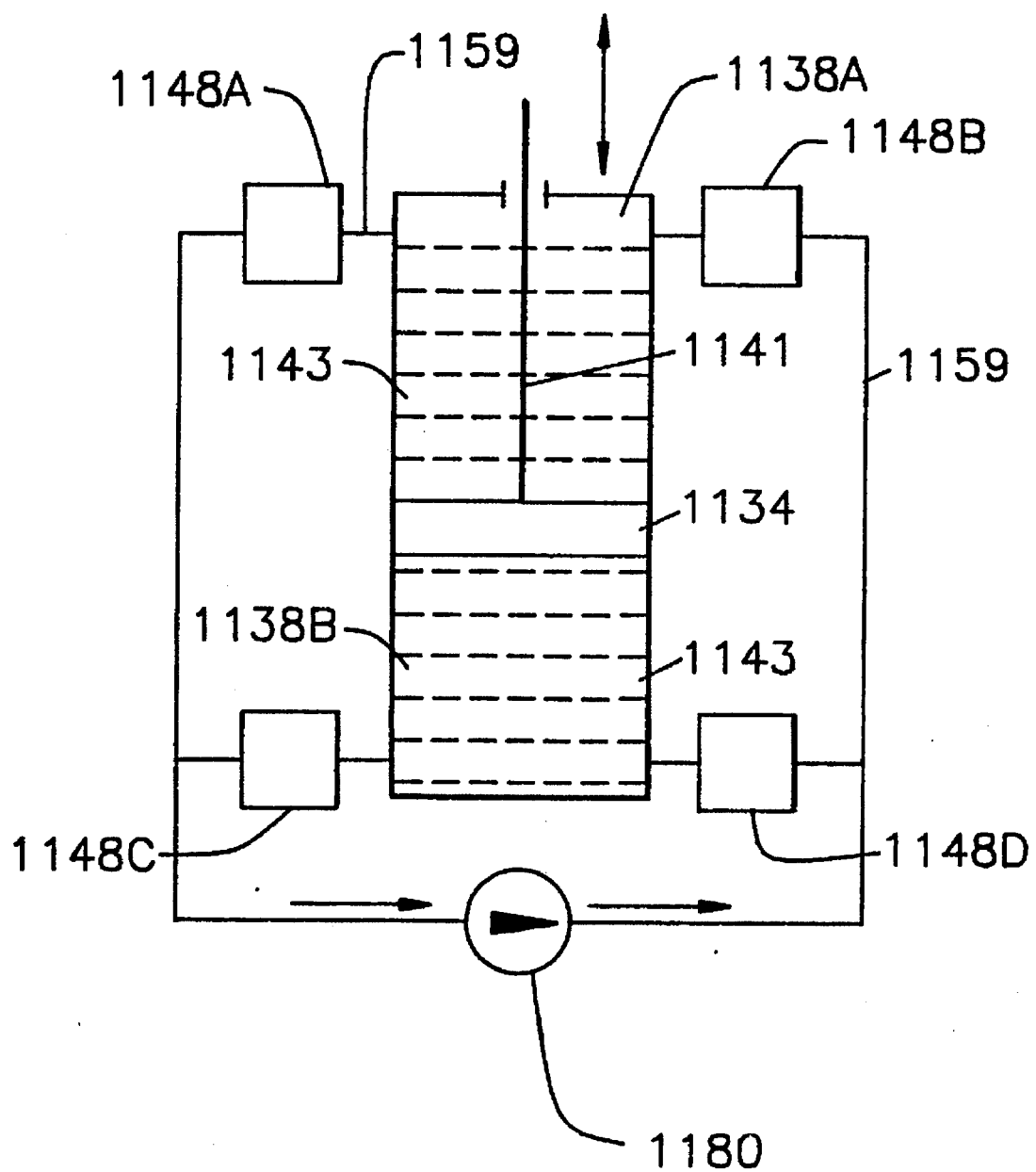
FIG. 11 is a control system for hydraulic cylinder piston motion employing a valve of the invention.

FIG. 11 shows a control scheme, using magnetorheological fluid, for hydraulic cylinder piston motion under active operating conditions. Hydraulic cylinder 1138 is partitioned into two chambers 1138A and 1138B by piston 1134, which is connected to rod 1141. Magnetorheological valves 1148A, 1148B, 1148C, and 1148D are connected with each other and with hydraulic chambers 1138A and 1138B via hydraulic conduit 1159. Hydraulic cylinder 1138 and hydraulic conduit 1159 are filled with magnetorheological fluid 1143. Pump 1180 causes the magnetorheological fluid 1143 to flow in only one predetermined direction in hydraulic conduit 1159.

Conducting a current through the windings of the diagonally located magnetorheological valves 1148A and 1148D, or through valves 1148B and 1148C, varies the hydraulic resistance, thereby yielding a pressure drop in the cylinder chamber corresponding to valve resistance, and causing corresponding displacement of the piston 1134. For example, conducting sufficient current through the windings of magnetorheological valves 1148A and 1148D to close them will cause the magnetorheological fluid to flow from chamber 1138B, through magnetorheological valve 1148C, pump 1180, and magnetorheological valve 1148B, into chamber 1138A. Thus closing valves 1148A and 1148D will move piston 1134 toward the bottom of hydraulic cylinder 1138.

This magnetorheological system may carry out movements according to the magnetorheological valve winding current supplied. An important feature of such a drive is its ability to reliably fix the actuator at a desired positioning point.

Figure 12:
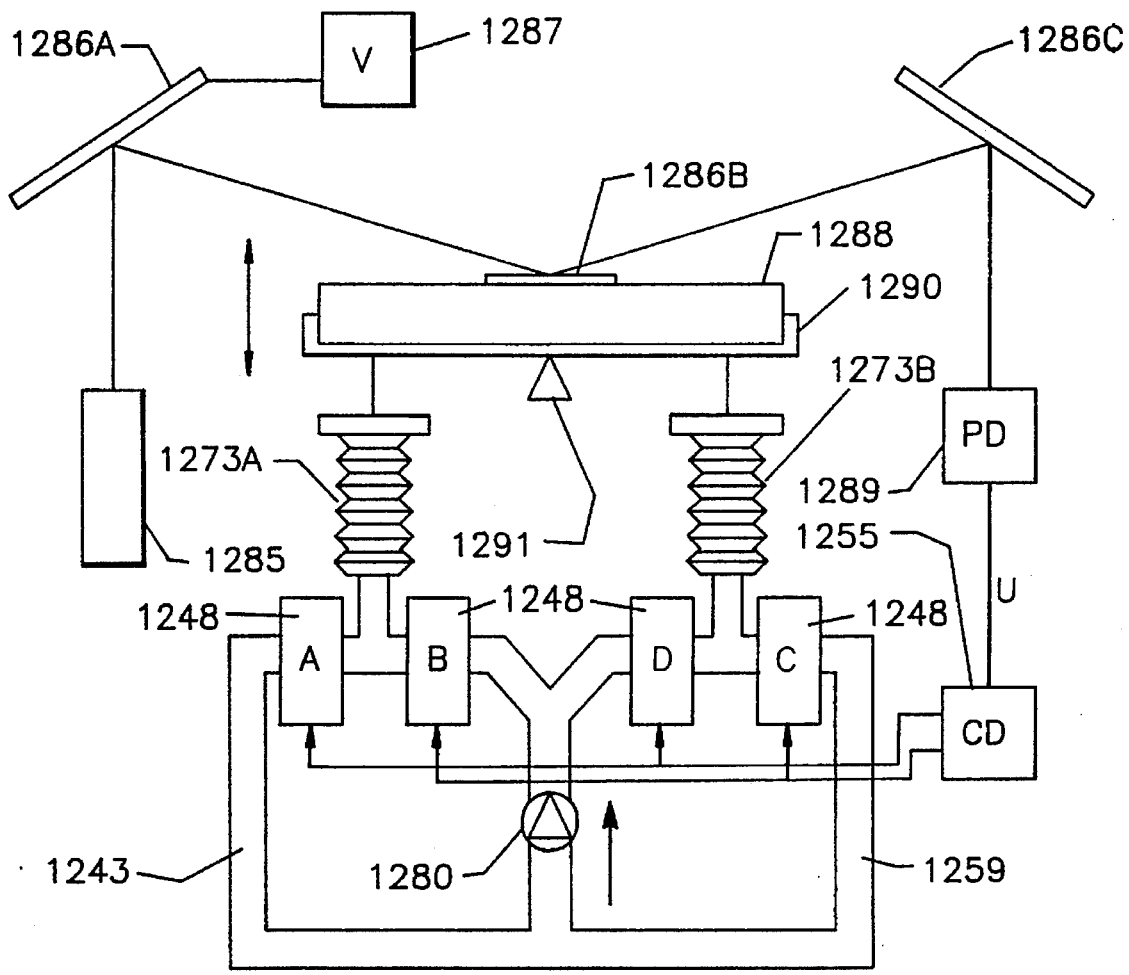
FIG. 12 is a system for stabilizing an object employing a valve of the invention.

FIG. 12 shows a schematic of a system for stabilizing an object with an active magnetorheological drive. In the stabilization system shown, an object is stabilized by the interaction of a magnetorheological drive and a light sensing means. An object 1288 is placed in movable frame 1290. Movable frame 1290 is supported by magnetorheological load-bearing elements 1273A and 1273B, which are connected to hydraulic conduit 1259, and frame support 1291. Magnetorheological valves 1248A, 1248B, 1248C, and 1248D and a pump 1280 regulate the flow of magnetorheological fluid 1243 to magnetorheological load-bearing elements 1273A and 1273B. Magnetorheological valves 1248A, 1248B, 1248C, and 1248D are connected to a control system 1255.

A mirror system 1286, comprised of movable mirror 1286A, mirror 1286B mounted on the object to be stabilized 1288, and mirror 1286C, reflects light generated by a laser source 1285. A vibration-causing device 1287 creates a disturbance in the light beam with a frequency and amplitude to be regulated, which is carried through the mirror system 1286 and projected onto a sensing means 1289. The sensing means 1289 measures the disturbance and generates an error signal of proportional amplitude to a control system 1255. In a preferred embodiment, the sensing means is a photodiode.

In operation, the laser source 1285 generates a beam of light which is reflected by mirror 1286A. The vibration causing device 1287 causes a disturbance in the light beam reflected by mirror 1286A. The light beam travels from mirror 1286A, to mirror 1286B, to mirror 1286C, to sensing means 1289. Sensing means 1289 measures the disturbance in the light beam and generates an error signal proportional to the amplitude of the disturbance. The error signal generated by the sensing means 1289 is received by the control device 1255, and output signals are sent to the magnetorheological valves 1248A, 1248B, 1248C, and 1248D. Varying the pressure in a pair of magnetorheological valves, such as 1248A and 1248D, redistributes the pressure in the load-bearing elements 1273A and 1273B and causes movable frame 1290 to pivot on frame support 1291, thereby displacing the object 1288 by an angle proportional to the value of the error signal generated by the sensing means 1289.

In tests of the above system, the object positioning error did not exceed 0.5 of an angular second over a frequency range up to 250 Hz.

Two or more one-coordinate load-bearing elements 1273 may be combined to form a multi-coordinate stabilization system. Such a multi-coordinate system may be used to dampen multi-dimensional vibrations in more complex systems. One possible use of such devices is in mirror positioning systems for lasers.

We claim:

1. A pneumohydraulic positioning device comprising:

at least one magnetoconducting cylinder partitioned into at least two chambers by a partition, wherein one chamber contains a magnetorheological fluid, and a second chamber contains a gas;

a pulley unit, wherein one end of the unit is attached to the partition, and a second end of the unit is attached to a carriage;

an actuator attached to the carriage;

at least one magnetorheological valve coupled with the chamber of the magnetoconducting cylinder containing magnetorheological fluid for varying the viscosity of magnetorheological fluid flowing through said valve;

a source of compressed gas coupled with the chamber of the magnetoconducting cylinder containing a gas; and a program control device coupled with the pulley unit, the source of compressed gas, and the magnetorheological valve.

2. An exercise machine comprising:

at least one magnetoconducting cylinder partitioned into at least two chambers by a piston head, wherein one chamber contains a magnetorheological fluid, and a second chamber contains a gas;

a load-carrying rod extending through the magnetoconducting cylinder from the piston head to a point external to the magnetoconducting cylinder; and at least one magnetotheological valve connected to the chamber of the magnetoconducting cylinder containing magnetorheological fluid for varying the viscosity of magnetorheological fluid flowing through said valve.

3. A vibration damping system comprising:

a lever system, supporting a vibrating load, connected to a base by a support pillar;

an elastic coupling connected to the lever system and the base;

at least one magnetorheological load-bearing element positioned between the lever system and the base, said element including a hydraulic cavity containing magnetorheological fluid; and a magnetorheological valve connected with the hydraulic cavity of the magnetorheological load-bearing element for varying the viscosity of the magnetorheological fluid flowing through said valve.

4. A pneumohydraulic drive, comprising:

two main cylinders, each partitioned into two chambers by a partition wherein one chamber contains a magnetorheological fluid and the other chamber contains a gas;

a hydraulic system connected to the chambers of said cylinders containing magnetorheological fluid, said hydraulic system including an hydraulic accumulator and at least one magnetorheological valve for varying the viscosity of magnetorheological fluid flowing through said valve;

a flexible member having one end connected to one of said partitions and an opposite end connected to the other of said partitions; and a carriage connected to said flexible member.

* * * * *

UNITED STATES PATENT AND TRADEMARK OFFICE
CERTIFICATE OF CORRECTION

PATENT NO. : 5,452,745
DATED : September 26, 1995
INVENTOR(S) : William I. KORDONSKY, et al.

It is certified that error appears in the above-indentified patent and that said Letters Patent is hereby corrected as shown below:

Column 3, line 42, change "magnetorheologicai" to --magnetorheological--.

Column 5, line 47, delete second "in".

Column 8, line 45, change "65:" to --651--.

Column 12, line 54, change "magnetotheological" to --magnetorheological--.

Signed and Sealed this

Nineteenth Day of March, 1996

Attest:

BRUCE LEHMAN

Attesting Officer

Commissioner of Patents and Trademarks